(12) United States Patent
Glasgow et al.

(10) Patent No.: US 6,506,355 B1
(45) Date of Patent: Jan. 14, 2003

(54) PRODUCTION OF HIGH SURFACE ENERGY, HIGH SURFACE AREA VAPOR GROWN CARBON FIBER

(75) Inventors: D. Gerald Glasgow, Centerville, OH (US); Max L. Lake, Yellow Springs, OH (US)

(73) Assignee: Applied Sciences, Inc., Cedarville, OH (US)

( * ) Notice: Subject to any disclaimer, the term of this patent is extended or adjusted under 35 U.S.C. 154(b) by 0 days.

(21) Appl. No.: 09/444,877

(22) Filed: Nov. 22, 1999

(51) Int. Cl.$^7$ .................................................. D01F 9/12
(52) U.S. Cl. ..................................................... 423/447.3
(58) Field of Search ....................................... 423/447.3

(56) References Cited

U.S. PATENT DOCUMENTS

| | | |
|---|---|---|
| 2,796,331 A | 6/1957 | Kauffman et al. |
| 3,378,345 A | 4/1968 | Papalegis et al. |
| 5,024,818 A | 6/1991 | Tibbetts et al. |
| 5,374,415 A | 12/1994 | Alig et al. |
| 5,594,060 A | 1/1997 | Alig et al. |

FOREIGN PATENT DOCUMENTS

| | | |
|---|---|---|
| JP | 09 078360 | 3/1997 |

OTHER PUBLICATIONS

Activation of Carbon Fibres by Steam and Carbon Dioxide, Dept. of Chemical Engineering Chungnam National University, Apr. 7, 1993, pp. 841–842.

F. Rodriguez–Reinoso et al, The Use of Steam and CO2 as activating Agents in the Preparation of Activated Carbons, Elsevier Science Ltd., vol. 33, No. 1, pp. 15–23, 1995.

G. Q. Lu et al., A Kinetic Study Of Coal Reject–Derived Char Activation With CO2, H20, and Air, vol. 30, No. 1, pp. 21–29, 1992.

H. Darmstadet et al. Effects of Surface Treatment on the Bulk Chemistry and Structure of Vapor Grown Carbon Fibers, Elsevier Science Ltd., vol. 35, No. 10–11, pp. 1581–1585, 1997.

D. Clark et al., The Surface Treatment of Carbon Fibres For Increasing The Interlaminar Shear Strength of CFRP, Royal Aircraft Establishement, Paper No. 7, pp. 44–51.

Ehrburger, Surface Properties Of Carbon Fibers, pp. 147–161, 1990.

Yoshnobu Otake et al., Characterization Of Oxygen–Containing Surface Complexes Created On A Microporous Carbon By Air and Nitric Acid Treatment, Pergamon Press Ltd., 1993, pp. 109–121.

U. Zielke et al., Surface–Oxidized Carbon Fibers: I. Surface Structure And Chemistry, Elsevier Science Ltd., vol. 34, No. 8, pp. 983–998, 1996.

J.B. Donnet et al., Surface Modification of Carbon Fibres And Their Adhesion To Epoxy Resins, Paper No. 9, pp. 58–63.

E. Fitzer et al., Chemical Interactions Between The Carbon Fibre Surface And Epoxy Resins, Pergamon Press Ltd., vol. 18, pp. 389–393, Aug. 23, 1979.

*Primary Examiner*—Stuart L. Hendrickson
(74) *Attorney, Agent, or Firm*—Killworth, Gottman, Hagan & Schaeff, L.L.P.

(57) ABSTRACT

High surface energy vapor grown carbon fibers and methods of making such fibers. The high surface energy vapor grown carbon fibers of the present invention have a surface energy greater than about 75 mJ/m$^2$ without post-manufacture treatment.

46 Claims, 1 Drawing Sheet

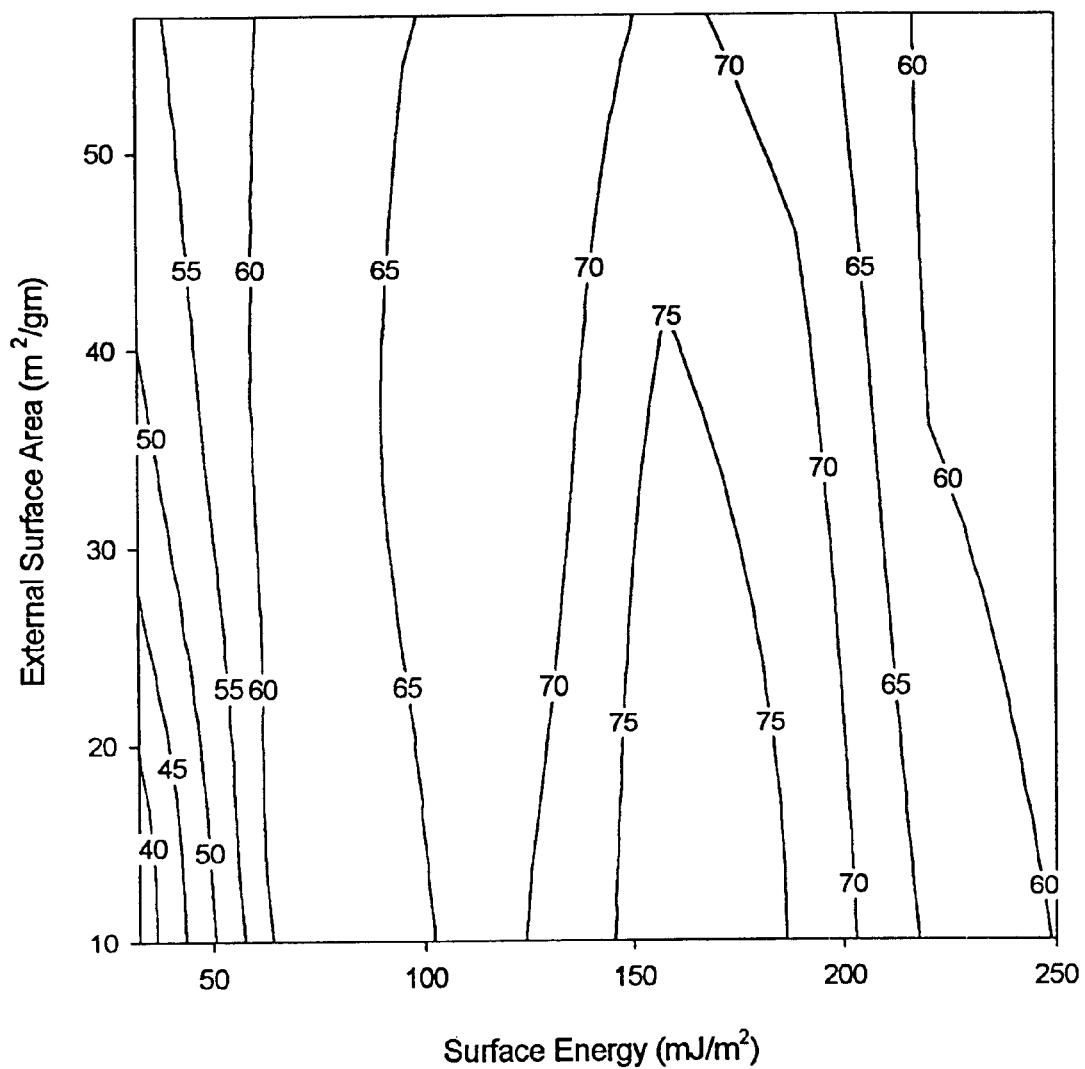
Figure 1. Tensile Strength of PP/VGCF Composites as A Function of Surface Area and Surface Energy

PRODUCTION OF HIGH SURFACE ENERGY, HIGH SURFACE AREA VAPOR GROWN CARBON FIBER

BACKGROUND OF THE INVENTION

The present invention relates to vapor grown carbon fibers generally, and more particularly to vapor grown carbon fibers having high surface energy and high surface area, and to methods of producing such fibers without post-manufacture treatment.

Commercial carbon fibers hold great promise as a high performance material for composites due to their high strength and high modulus. They are commonly made by elevating a precursor material such as polyacrylonitrile (PAN) or pitch in an inert atmosphere to a temperature around 1000° C. on continuous wind-up devices. They are generally continuous filaments and approximately 8 $\mu$m diameter.

This application is concerned with vapor grown carbon fibers (VGCF), which are a relatively recent entry in the field of carbon fibers and have similar or even superior physical properties, along with the potential for production at a lower cost.

The concept underlying the production of VGCF begins with metallic particles, with iron generally being the predominant constituent, which catalyze the growth of long slender partially graphitic filaments when exposed to a hydrocarbon gas in the temperature range of 600°–1500° C. It is known that sulfur enhances the growth (Kaufmann, U.S. Pat. No. 2,796,331) and that ammonia results in improved distribution in fiber diameter (Alig, et al. U.S. Pat. No. 5,374,415).

The iron catalyst required for the reaction is provided by using either liquid zero valent iron compounds such as iron pentacarbonyl or solid zero valent iron compounds dissolved in liquid hydrocarbons. An example of the latter is ferrocene. Liquid compounds are preferred since their introduction into the reactor is easier to control. They are most readily introduced by bubbling an inert gas through the liquid, thus carrying the catalyst into the reactor in the vapor state. The normal inert gases used for this method are argon, helium, and nitrogen.

U.S. Pat. No. 5,024,818 to Tibbetts et al. and U.S. Pat. No. 5,374,415 to Alig et al., the disclosures of which are hereby incorporated by reference, describe typical reaction processes and chambers. VGCF differ substantially from commercial carbon fiber in that VGCF are not continuous. They are about 0.001 to 0.04 mm long. Also, VGCF are much finer than their continuously grown counterparts. In addition, upon leaving the reactor, the fibers exist as an entangled mass that is very lightweight with a large apparent volume, from 5 to 50 ft$^3$/lb. In other words, the fibers form a lightweight, fluffy entangled mass. In this state, the fibers are very difficult to ship and handle. Such a light and fluffy material is almost impossible to incorporate into mixing equipment that typically processes rubber or plastic. The fly loss and incorporation time are tremendous.

The VGCF produced by these processes have a surface energy in the range of 25 to 40 mJ/m$^2$. This surface energy, although useful for some applications, is considered low with respect to the ability of resins to wet and, therefore, to adhere to the fiber for purposes of preparing useful composites. Due to the low surface tension, the fibers cannot be easily wetted out or mixed into liquid applications without prior surface treatments. These problems represent a severe limitation on the use of VGCF, as they cannot be readily dispersed into rubbers, plastics or the like. Thus, the development of methods by which the VGCF are wet out is important to the commercialization of these materials.

The conventional technique for providing the required surface modification of VGCF involves exposure to one or more of a number of oxidizing or etching agents in a post-manufacture processing step. "Surface Properties of Carbon Fibers" P. Ehrburger, in *Carbon Fibers and Filaments*, pp 147–161, J. L. Figueiredo, et al. (eds.) Kluwer Academic Publishers, 1990. "Effect of Surface Treatment on the Bulk Chemistry and Structure of Vapor Grown Carbon Fibers", H.Darmstadt et al., CARBON, 35, no. 11, pp. 1581–1585, 1997. Such post-manufacture processing steps have also been demonstrated to provide desired modification of surface properties of VGCF. "Effect of Surface Treatment on the Bulk Chemistry and Structure of Vapor Grown Carbon Fibers", H. Daimstadt et al., CARBON, 35, no. 11, pp. 1581–1585, 1997.

Carbon fibers may be activated by exposure to a number of oxidizing agents in the gas phase, including $H_2O$ and $CO_2$. "Activation of Carbon Fibers by Steam and Carbon Dioxide", S. K. Ryu, et al., CARBON 31, no. 5, pp. 841–842, 1993. Also, the use of ammonia as an additive gas during fiber synthesis, as taught by U.S. Pat. No. 5,374,415, has been shown to have beneficial impact on the morphology of the fiber, and to modify the surface of the fiber. Furthermore, the use of air containing $O_2$ as a purge gas following the synthesis of the fiber has been shown to provide some degree of oxidation of the fiber.

However, the known processes for increasing the surface energy and surface area of VGCF require post-manufacture treatment, which increases the cost and complexity of production. Accordingly, there is a need for methods of making high surface energy VGCF without post-manufacture treatment. There is also a need to produce such fibers in a way that maintains the physical integrity of the fiber, i.e., the inherent fiber strength is not compromised, and other inherent fiber properties, such as electrical and thermal conductivity, are maintained.

SUMMARY OF THE INVENTION

These needs are met by the present invention whereby high surface energy VGCF and methods of making such fibers are provided. The high surface energy VGCF of the present invention have a surface energy greater than about 75 mJ/m$^2$ without post-manufacture treatment. They preferably have a surface energy in the range of about 125 to about 185 mJ/m$^2$ and more preferably about 145 to about 185 mJ/m$^2$. In addition, they preferably have a total surface area in the range of about 25 to about 200 m$^2$/g, and an external surface area greater than 20 m$^2$/g. The surface area of the high surface energy vapor grown carbon fibers is preferably increased by a factor of at least 2, more preferably 10 or greater.

The invention teaches the use of a gaseous oxidant, such as $CO_2$, as an additive during fiber synthesis in order to provide the desired surface modification to the fiber, including increased surface area and surface energy. Because $CO_2$ is known to oxidize carbon as well as iron, the use of $CO_2$ during fiber synthesis might be expected to poison the fiber synthesis reaction, or to degrade the mechanical properties of the fiber. Thus, the successful use of $CO_2$ as a surface-modifying agent during a one-step fiber synthesis process without serious adverse effects on fiber synthesis rates or fiber structural properties was unexpected. This discovery reduces the cost and complexity of the production of high surface energy VGCF. It provides a one-step fiber synthesis process without the necessity of post-manufacture treatment.

In accordance with the present invention, methods of making a high surface energy VGCF are provided. One method involves forming a mixture comprising a gaseous hydrocarbon, ammonia, and an iron-containing compound decomposable to form iron nucleation sites. The hydrocarbon and the ammonia are present in an amount sufficient to provide a ratio of carbon atoms to nitrogen atoms in a range of from about 1:1 to 30:1. The gaseous oxidant is added as a separate stream to the mixture. The mixture is heated in a reactor for a time and at a temperature sufficient to cause decomposition of the decomposable compound to form particles of nanometer size iron nucleation sites dispersed and entrained in the gaseous mixture which induce growth of carbon fibers. High surface energy VGCF are formed, which have an average diameter of about 0.05 to about 0.5 micron, contain carbon and nitrogen, and have a surface energy greater than about 75 $mJ/m^2$. The high surface energy VGCF are then recovered.

In another embodiment, the carbon dioxide is introduced into the mixture by using it as a carrier for the iron-containing compound.

Accordingly, it is an object of the present invention to provide methods of making high surface energy VGCF without post-manufacture treatment. Another object of the invention is to provide high surface energy VGCF having a surface energy greater than about 75 $mJ/m^2$ without post-manufacture treatment. These and other objects and advantages of the present invention will become apparent from the following detailed description, the accompanying drawings, and the appealed claims.

BRIEF DESCRIPTION OF THE DRAWINGS

FIG. 1 is a tensile strength contour graph (MPa) of eight composites made with post-manufacture treated carbon fibers.

DETAILED DESCRIPTION OF THE INVENTION

The process for the production of VGCF is a modification of the vapor deposition process described in U.S. Pat. No. 5,374,415, which is incorporated by reference. In one embodiment, high surface energy VGCF are formed in a gas phase reaction by first forming a mixture comprising a gaseous hydrocarbon, a iron-containing compound decomposable to form iron nucleation sites and ammonia. The gaseous oxidant is added as a separate stream to the mixture. The hydrocarbon and ammonia are present in an amount sufficient to provide a ratio of carbon atoms to nitrogen atoms in a range of from about 1:1 to 30:1. The mixture is heated in the reactor for a time and at a temperature sufficient to decompose the decomposable compound to form nuclei which induce growth of carbon fibers. The VGCF are then recovered from the reactor. The VGCF produced have a surface energy greater than 75 $mJ/m^2$ without post-manufacture treatment, preferably in the range of about 125 to about 185 $mJ/m^2$, more preferably in the range of about 145 to about 185 $mJ/m^2$.

The VGCF preferably have a surface area in the range of about 10 to about 200 $m^2/g$, more preferably about 25 to about 100.

The gaseous hydrocarbon preferably includes at least one selected from methane, ethane, propane, ethylene, acetylene, natural gas and vaporizable hydrocarbons. Most preferably, the hydrocarbon is selected from methane, high methane natural gas having a methane content of at least 90 volume percent, and mixtures thereof.

The decomposable iron-containing compound is preferably iron pentacarbonyl.

Carbon dioxide is the preferred oxidant because it is the mildest of the gaseous oxidants, and therefore, potentially offers a wider operating window, it is relatively inexpensive, it is easy and safe to handle, and it is compatible with iron pentacarbonyl, the preferred catalyst. However, other oxidants such as $H_2O$ and $O_2$ could be used.

Alternatively, rather than supplying the oxidizing agent in a separate stream it can be introduced as the carrier for the iron-containing compound.

In addition to introducing the oxidant gas with the reactant gas mixtures, the oxidizing gas can be introduced at other points in the reactor system. For, example, the oxidant gas could be introduced into the exit end of the reactor so that the fibers interacted with it while they were still very hot as they exit the reactor. Under these conditions the fiber-oxidant gas mixture would be very reactive and fiber surface modification could be accomplished in the very short residence times that exist at the reactor exit port.

The ability to modify the fiber surface is dependent to some extent on the choice of oxidant used to do the modification. For example $CO_2$ is a mild oxidant that produces a high surface energy fiber along with the modest increases in surface area and little, if any, introduction of fiber surface functional groups. On the other hand the use of air (oxygen) or water as the oxidant provides a more aggressive oxidizing environment which results in the introduction of more functional groups on the fiber surface. There is benefit to be derived from use of each type of oxidant since the compatibility of the corresponding fiber with various matrix resins will be affected.

Preferably, a sulfur-containing gaseous compound, such as hydrogen sulfide, is included in the mixture. The number of hydrogen sulfide molecules should be at least as great as the number of atoms of the iron in the decomposable compound. The hydrogen sulfide enhances the fiber growth from the iron catalyst and remains with the fiber. Thus, for abundant fiber formation, hydrogen sulfide addition is preferred.

The ammonia, air, and sulfur used in the reaction during formation provide sites on the fiber and can be adjusted and tailored depending upon the desired end use.

VGCF produced by the process of U.S. Pat. No. 5,374,415 were post-treated for comparison with the high surface energy VGCF of the present invention. The surface of the VGCF was oxidized by heating in the presence of carbon dioxide, at a temperature and for a time sufficient to produce a high surface energy VGCF having a surface energy greater than about 75 $mJ/m^2$. Table 1 shows the results of a series of experiments in which the time, temperature, and flow rate of carbon dioxide were varied. Run 11 gives the property values for the fibers as produced, without any additional treatment, for comparison.

TABLE 1

CO₂ OXIDIZED PR-11 FIBER

| Run No. | Time Min. | Temp °C. | CO₂ Flow, L/min. | Surface Area, m²/g Total | Surface Area, m²/g External | Surface energy, mJ/m² | Surface Composition O | Surface Composition N | Surface Composition S | Weight Loss, % Initial | Weight Loss, % Adjusted |
|---|---|---|---|---|---|---|---|---|---|---|---|
| 1 | 120 | 900 | 10 | 191 | 57 | 466 | | | | | |
| 2 | 60 | 950 | 10 | 185 | 46 | 472 | | | | | |
| 3 | 15 | 850 | 2 | 24 | 16 | 152 | 1.3 | 0.3 | 0.3 | −0.27 | −6.96 |
| 4 | 120 | 850 | 2 | 83 | 28 | 106 | | | | 24.27 | 19.19 |
| 5 | 15 | 950 | 2 | 43 | 23 | 179 | 0.9 | 0.5 | 0.2 | 4.83 | −2.44 |
| 6 | 120 | 950 | 2 | 123 | 46 | 79 | | | | 47.6 | 43.58 |
| 7 | 15 | 850 | 9.2 | 26 | 15 | 156 | 1.2 | 0.4 | 0.2 | −4.7 | −11.70 |
| 8 | 120 | 850 | 9.2 | 65 | 34 | 116 | | | | 18.2 | 12.75 |
| 9 | 15 | 950 | 9.2 | 91 | 53 | 248 | 0.3 | 0.6 | 0.2 | 40.0 | 35.41 |
| 10 | 120 | 950 | 9.2 | 120 | 47 | 361 | | | | 74.8 | 72.82 |
| 11 | | | | 110 | | | | | 48 | | |

The various operating conditions yields fibers with varying amounts of weight loss. It was expected that higher weight loss would translate into more severe fiber damage, and as a result, a lower strength fiber. The amount of fiber damage was estimated from an examination of transmission electron micrographs of the fibers. The micrographs confirmed that the fibers from experiments which produced high weight loss showed much more severe fiber damage.

As these experiments demonstrate, the surface energy and surface area of VGCF can be increased significantly using this oxidation process. The amount of the increase can be controlled by controlling the reaction time, temperature, and flow rate of carbon dioxide.

The adhesion of the post-treated VGCF to a polymer matrix was evaluated using composite tensile strength as a measure of fiber-matrix adhesion. Tensile strength is known to have a direct positive relationship to fiber-matrix adhesion. In order to test composite tensile strength, eight polypropylene (PP) composites were made, each containing 15-volume % of fiber. Four samples were selected from those shown in Table 2, and the remaining four were made using other processes and were chosen to cover a wide range of surface energies. The surface energy and surface area values for the eight fibers were determined. External surface area values were calculated for the fibers because the microporous areas of the fibers were not expected to contribute to adhesion due to the difficulty of getting the high viscosity molten PP to flow into pores which are 20 angstroms or less in diameter.

FIG. 1 shows the results of a contour plot of the tensile strength of the eight composites against the external surface area and surface energy. The optimum fiber-matrix adhesion (tensile strength) occurs when the fiber surface has not been extensively oxidized, i.e., the increase in surface area is two-fold or less and the surface energy is between about 145 and about 185 mJ/m².

The high surface energy VGCF of the present invention were tested for comparison with post-treated VGCF. The high surface energy VGCF made by the process of adding carbon dioxide as a separate stream were characterized for surface energy and surface area, and the results are shown in Table 2. Table 2 includes data for the standard production of VGCF (PR-11) and for fiber produced using post-production oxidation for comparison. The data shows that the in situ addition of carbon dioxide produces high surface energy VGCF comparable to VGCF produced using post-production oxidation.

TABLE 2

| Experiment No. | CO₂ Flow Rate, cc/min | Surface Area, m²/gm Total | Surface Area, m²/gm External | Surface Energy mJ/m² Total | Atomic % Oxygen |
|---|---|---|---|---|---|
| PR-11 (old data) | 0 | 17.6 | 12.1 | 26 | 1.1 |
| Pr-11 (recent data) | 0 | 19.5 | 16.0 | | 1.9 |
| 2 | 1150 | 24.7 | 18.6 | 125.3 | 1.9 |
| 4 | 4600 | 27.0 | 19.1 | | |
| 5 | 9200 | 30.7 | 21.7 | 103.8 | |
| Run 7, Table 1 | | 26 | 15 | 156 | 1.2 |

The high surface energy VGCF produced using carbon dioxide as the carrier gas for the iron pentacarbonyl were also analyzed. This process yielded fibers having a surface energy of 124.8 mJ/m² (total), and a surface area of 27.8 m²/g (total) and 21.0 m²/g (external). These values are close to those of the post-treated VGCF fiber used to produce the PP composite with the maximum tensile strength, as shown in FIG. 1.

As these experiments demonstrate, high surface energy VGCF produced during synthesis without post-manufacture treatment yield comparable surface energy and surface area to post-treated VGCF.

The addition of the carbon dioxide in the present invention to the process of U.S. Pat. No. 5,374,415 did not affect production of the fibers. Neither the output nor the bulk density of the fibers were altered.

The high surface energy VGCF of the present invention can optionally be post-treated by pyrolytic stripping. This fiber cleaning operation is readily conducted by heating the high surface energy VGCF fiber to a temperature between about 400° and 1000° C. under a slow flow of inert gas (about 2 l/min). The exact time-temperature profile depends on the temperature used. The resulting surface energy of fibers produced with post-manufacture pyrolytic stripping is about 135 mJ/m². The surface area of these fibers is in the range of 20–35 m²/g. These values are in the same range as those which produced the highest levels of adhesion as shown in FIG. 1.

One benefit of pyrolytic stripping is the removal of undesirable organic surface contamination from the fiber. The organic contamination, which is mainly polyaromatic hydrocarbons, interferes with fiber-matrix adhesion. It is also a source of potentially carcinogenic compounds. Thus, pyrolytic stripping involves both property enhancement and potential health benefits.

Fibers produced by pyrolytic stripping are readily wet by both organic liquids and water. The high surface energy results in the matrix resin wetting the fiber more efficiently and effectively, which translates into improved adhesion and higher tensile strengths. As discussed above, the VGFC fiber produced by the process of U.S. Pat. No. 5,374,415 is wet by a variety of organic liquids, but is not wet by water without the use of surfactants.

The processes of the present invention allow production of high surface energy VGCF without post-manufacture treatment. These fibers should enhance the mechanical properties of composites using a variety of matrix resins. In addition, because of the limited amount of fiber surface modification, other properties of the fiber, such as electrical and thermal conductivity, should not be affected.

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A method of making a high surface energy vapor grown carbon fiber comprising;
   forming a mixture comprising a gaseous hydrocarbon, ammonia, and an iron-containing compound decomposable to form iron nucleation sites dispersed in a carrier of gaseous oxidant, the hydrocarbon and the ammonia each being present in an amount sufficient to provide a ratio of carbon atoms to nitrogen atoms in a range from about 1:1 to 30:1;
   heating the mixture containing the gaseous oxidant in a reactor for a time and at a temperature sufficient to cause decomposition of the decomposable compound to form particles of nanometer size iron nucleation sites dispersed and entrained in the gaseous mixture which induce growth of carbon fibers, and to thereby form high surface energy vapor grown carbon fibers having an average diameter of about 0.05 to about 0.5 micron and containing carbon and nitrogen and having a surface energy greater than about 75 $mJ/m^2$; and
   recovering the high surface energy vapor grown carbon fibers.

2. The method of claim 1 wherein the gaseous hydrocarbon is at least one selected from methane, ethane, propane, ethylene, acetylene, natural gas and vaporizable hydrocarbons.

3. The method of claim 1 wherein the gaseous hydrocarbon is selected from methane, high methane natural gas having a methane content of at least 90 volume percent, and mixtures thereof.

4. The method of claim 1 wherein the decomposable compound comprises iron pentacarbonyl.

5. The method of claim 1 wherein the mixture further comprises a gaseous sulfur-containing compound.

6. The method of claim 5 wherein the gaseous sulfur-containing compound is hydrogen sulfide.

7. The method of claim 1 wherein the surface energy is the range of about 125 to about 185 $mJ/m^2$.

8. The method of claim 7 wherein the surface energy is in the range of about 145 to about 185 $mJ/m^2$.

9. The method of claim 1 wherein the high surface energy vapor grown carbon fiber has a total surface area in the range of about 25 to about 100 $m^2/g$.

10. The method of claim 1 wherein the high surface energy vapor grown carbon fiber has an external surface area greater than about 20 $m^2/g$.

11. The method of claim 1 wherein the total surface area is increased by a factor of more than 2 compared to the total surface area of vapor grown carbon fibers which have not been oxidized.

12. The method of claim 1 wherein the gaseous oxidant is selected from carbon dioxide, air, oxygen, and water vapor.

13. The method of claim 1 further comprising heating the high surface energy vapor grown carbon fibers to a temperature between about 400° and about 1000° C. under a flow of an inert gas.

14. A method of making a high surface energy vapor grown carbon fiber comprising:
   forming a mixture comprising a gaseous hydrocarbon, ammonia, and an iron-containing compound decomposable to form iron nucleation sites, the hydrocarbon and the ammonia each being present in an amount sufficient to provide a ratio of carbon atoms to nitrogen atoms in a range of from about 1:1 to 30:1;
   introducing a gaseous oxidant into the mixture before forming the high surface energy vapor grown carbon fibers;
   heating the mixture containing the gaseous oxidant in a reactor for a time and at a temperature sufficient to cause decomposition of the decomposable compound to form particles of nanometer size iron nucleation sites dispersed and entrained in the gaseous mixture which induce growth of carbon fibers, and to thereby form high surface energy vapor grown carbon fibers having an average diameter of about 0.05 to about 0.5 micron and containing carbon and nitrogen and having a surface energy greater than about 75 $mJ/m^2$; and
   recovering the high surface energy vapor grown carbon fibers.

15. The method of claim 1 wherein the gaseous oxidant is selected from carbon dioxide, air, oxygen, and water vapor.

16. The method of claim 1 wherein the high surface energy vapor grown carbon fiber has a total surface area in the range of about 10 to about 200 $m^2/g$.

17. The method of claim 1 wherein the total surface area is increased by a factor of more than 10 compared to the total surface area of vapor grown carbon fibers which have not been oxidized.

18. The method of claim 14 further comprising heating the high surface energy vapor grown carbon fibers to a temperature between about 400° and about 1000° C. under a flow of inert gas.

19. The method of claim 14 wherein the total surface area is increased by a factor of more than 10 compared to the total surface area of vapor grown carbon fibers which have not been oxidized.

20. The method of claim 14 wherein the high surface energy vapor grown carbon fiber has a total surface area in the range of about 10 to about 200 $m^2/g$.

21. The method of claim 14 wherein the total surface area is increased by a factor of more than 2 compared to the total surface area of vapor grown carbon fibers which have not been oxidized.

22. The method of claim 14 wherein the gaseous hydrocarbon is at least one selected from methane, ethane, propane, ethylene, acetylene, natural gas and vaporizable hydrocarbons.

23. The method of claim 14 wherein the gaseous hydrocarbon is selected from methane, high methane natural gas having a methane content of at least 90 volume percent, and mixtures thereof.

24. The method of claim 14 wherein the decomposable compound comprises iron pentacarbonyl dispersed in a carrier.

25. The method of claim 14 wherein the mixture further comprises a gaseous sulfur-containing compound.

26. The method of claim 25 wherein the gaseous sulfur-containing compound is hydrogen sulfide.

27. The method of claim 14 wherein the surface energy is the range of about 125 to about 185 mJ/m$^2$.

28. The method of claim 27 wherein the surface energy is in the range of about 145 to about 185 mJ/m$^2$.

29. The method of claim 14 wherein the high surface energy vapor grown carbon fiber has a total surface area in the range of about 25 to about 100 m$^2$/g.

30. The method of claim 14 wherein the high surface energy vapor grown carbon fiber has an external surface area greater than about 20 m$^2$/g.

31. The method of claim 14 wherein the gaseous oxidant is selected from carbon dioxide, air, oxygen, and water vapor.

32. A method of making a high surface energy vapor grown carbon fiber comprising:

forming a mixture comprising a gaseous hydrocarbon, ammonia, and an iron-containing compound decomposable to form iron nucleation sites, the hydrocarbon and the ammonia each being present in an amount sufficient to provide a ratio of carbon atoms to nitrogen atoms in a range of from about 1:1 to 30:1;

heating the mixture in a reactor for a time and at a temperature sufficient to cause decomposition of the decomposable compound to form particles of nanometer size iron nucleation sites dispersed and entrained in the gaseous mixture which induce growth of carbon fibers and to thereby form vapor grown carbon fibers having an average diameter of about 0.05 to about 0.5 micron and containing carbon and nitrogen;

introducing a gaseous oxidant at the exit of the reactor and modifying the surface of the vapor grown carbon fibers to form high surface energy vapor grown carbon fibers having a surface energy greater than about 75 mJ/m$^2$; and recovering the high surface energy vapor grown carbon fibers.

33. The method of claim 32 wherein the high surface energy vapor grown carbon fiber has a total surface area in the range of about 10 to about 200 m$^2$/g.

34. The method of claim 32 wherein the gaseous hydrocarbon is at least one selected from methane, ethane, propane, ethylene, acetylene, natural gas and vaporizable hydrocarbons.

35. The method of claim 32 wherein the gaseous hydrocarbon is selected from methane, high methane natural gas having a methane content of at least 90 volume percent, and mixtures thereof.

36. The method of claim 32 wherein the decomposable compound comprises iron pentacarbonyl dispersed in a carrier.

37. The method of claim 32 wherein the mixture further comprises a gaseous sulfur-containing compound.

38. The method of claim 37 wherein the gaseous sulfur-containing compound is hydrogen sulfide.

39. The method of claim 32 wherein the surface energy is the range of about 125 to about 185 mJ/m$^2$.

40. The method of claim 39 wherein the surface energy is in the range of about 145 to about 185 mJ/m$^2$.

41. The method of claim 32 wherein the high surface energy vapor grown carbon fiber has a total surface area in the range of about 25 to about 100 m$^2$/g.

42. The method of claim 32 wherein the high surface energy vapor grown carbon fiber has an external surface area greater than about 20 m$^2$/g.

43. The method of claim 32 wherein the total surface area is increased by a factor of more than 2 compared to the total surface area of vapor grown carbon fibers which have not been oxidized.

44. The method of claim 32 wherein the total surface area is increased by a factor of more than 10 compared to the total surface area of vapor grown carbon fibers which have not been oxidized.

45. The method of claim 32 wherein the gaseous oxidant is selected from carbon dioxide, air, oxygen, and water vapor.

46. The method of claim 32 further comprising heating the high surface energy vapor grown carbon fibers to a temperature between about 400° and about 1000° C. under a flow of inert gas.

* * * * *

UNITED STATES PATENT AND TRADEMARK OFFICE
CERTIFICATE OF CORRECTION

PATENT NO.    : 6,506,355 B1
DATED         : January 14, 2003
INVENTOR(S)   : Glasgow et al.

It is certified that error appears in the above-identified patent and that said Letters Patent is hereby corrected as shown below:

<u>Column 4,</u>
Line 22, reads as "For, example," should read -- For example, --.

<u>Column 5,</u>
Line 18, reads as under column titled Surface Energy, mJ/m2 "blank", should read under column titled Surface Energy, mJ/m2 -- 48 --.
Line 18, reads as under column titled Surface Composition (S) "48", should read under column titled Surface Composition (S) -- blank --.

Signed and Sealed this

Twenty-fourth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,506,355 B1
DATED : January 14, 2003
INVENTOR(S) : D. Gerald Glasgow and Max L. Lake It is certified that error appears in the above-identified patent and that said Letters Patent is hereby corrected as shown below:

<u>Column 7,</u>
Line 5, "the VGFC" should be -- the VGCF --.

Signed and Sealed this

First Day of June, 2004

JON W. DUDAS
*Acting Director of the United States Patent and Trademark Office*